United States Patent [19]
Mayhue et al.

[11] Patent Number: 6,089,872
[45] Date of Patent: Jul. 18, 2000

[54] DEVICE FOR TEACHING TYPING

[76] Inventors: Glenda F. Mayhue; Robert W. Mayhue, both of 4827 Mystere Cir., Lilburn, Ga. 30047

[21] Appl. No.: 09/143,263

[22] Filed: Aug. 28, 1998

[51] Int. Cl.[7] .................................................. G09B 13/00
[52] U.S. Cl. ............................................................ 434/233
[58] Field of Search ................................... 434/233, 227, 434/230, 231, 112, 117, 229

[56] References Cited

U.S. PATENT DOCUMENTS

| | | | |
|---|---|---|---|
| 2,570,908 | 10/1951 | Behr | 35/5 |
| 3,501,849 | 3/1970 | Olsen | 35/6 |
| 4,465,477 | 8/1984 | AvGavaar | 434/233 |
| 4,909,739 | 3/1990 | Ladner et al. | 434/233 |
| 5,314,337 | 5/1994 | Dixon | 434/227 |
| 5,486,112 | 1/1996 | Troudet | 434/233 |
| 5,507,649 | 4/1996 | Troudet | 434/233 |
| 5,554,032 | 9/1996 | Troudet | 434/233 |

FOREIGN PATENT DOCUMENTS

| | | | |
|---|---|---|---|
| 46001 | 7/1932 | Denmark | 434/233 |
| 2451079 | 11/1990 | France | 434/233 |
| WO 91/08559 | 6/1991 | WIPO | 434/233 |

*Primary Examiner*—Robert A. Hafer
*Assistant Examiner*—K Fernstrom
*Attorney, Agent, or Firm*—Kennedy, Davis & Hodge, LLP

[57] ABSTRACT

An apparatus for teaching efficient typing comprises a glove (10) having a wristband (14), a backhand section (16) adjacent the wristband, a plurality of finger sleeves (18) adjacent the backhand section and having an opening at a distal end for exposing a fingertip, and a plurality of visually different finger codes (28) extending from said finger sleeves toward said wristband, and a keyboard (12) bearing key codes that visually correspond to the finger codes.

13 Claims, 3 Drawing Sheets

DEVICE FOR TEACHING TYPING

TECHNICAL FIELD

This invention relates generally to typewriter and computer keyboards, and more particularly to devices for teaching typing on typewriters and computer keyboards.

BACKGROUND OF THE INVENTION

For efficient typing on conventional typewriter and computer keyboards, it is generally desired that typists learn to use each finger to operate a particular group of keys on the keyboard. To teach students efficient typing skills, instructors have in the past used a variety of training devices. Some of these devices provide for placing indicia on the fingers of a student and placing corresponding indicia on the keys of the keyboard. The student matches the indicia to determine the appropriate finger for operating particular keys. For instance, U.S. Pat. No. 5,314,337 describes colored stickers for application to a student's fingers and corresponding colored stickers for application to the keyboard keys. The student matches the colors of the finger stickers to the colors of the keyboard stickers.

U.S. Pat. No. 4,909,739 describes colored plastic rings that slide onto a student's fingers. The student matches the colors of the rings to corresponding colored stickers that are applied to the keys of the keyboard.

U.S. Pat. No. 4,465,477 describes a more complex configuration in which magnet devices attach to a student's finger tips. Electrically charged keys draw the magnets attached to particular fingers toward the corresponding series of keys.

U.S. Pat. No. 2,570,908 describes flat bendable pads with finger-covering extensions that are strapped to a student's hands. Alphanumeric indicia attaches to the finger-covering extensions whereby students match the indicia to the corresponding numbered and lettered keys on a keyboard.

One drawback to such existing devices is that they encourage poor typing techniques and poor posture. A user of such devices must look directly at the indicia attached to the fingers and to the keyboard in order to identify the proper finger to be used for a particular key. Often the user must raise the fingers from the keyboard in order to view the indicia on the back of the fingers. Such movements away and back to the keyboard are contrary to proper typing techniques which encourage training the eyes to remain on the document being typed and the fingers to maintain contact with the keyboard.

Also, such devices are not adapted for use by children as the devices are prone to misalignment upon children's fingers, or are too complicated for operation by children. Also, the stickers used in such devices require individual application to a child's fingers and are prone to falling off or to premature removal by the child. The colored rings used in such devices are easily misplaced or lost by children. Additional effort by teachers is required to confirm that the appropriately colored rings are placed on proper fingers. The device that employs magnets requires cognitive and associative skills to appreciate the selective application of magnetism among the typist's fingers to learn proper typing techniques.

Accordingly, there remains a need in the art for a device for teaching efficient typing that enables a child to determine which finger appropriately operates a selected key without the child's hands leaving the keyboard while the teaching device maintains indicia on the hands without requiring realignment or reapplication of the indicia during training. It is to the provision of such that the present invention is directed.

SUMMARY OF THE INVENTION

The present invention meets the above-described need in the art by providing an apparatus for teaching efficient typing comprising a glove and a keyboard. A wristband of the glove encircles a person's wrist. A backhand section is adjacent the wristband to cover the back of the person's hand. A plurality of finger sleeves is adjacent the backhand section opposite the wristband. Each of the finger sleeves has an opening at a distal end for exposing a fingertip. A plurality of finger codes extends from the wristband along the finger sleeves. Each of the finger codes is visually different from the other finger codes. Each of the finger codes is associated with a respective one of the finger sleeves. The keyboard has a plurality of keys. Each of the keys bears a key code that visually corresponds to one of the finger codes. A person wearing the glove visually matches the key code on a particular key to the corresponding finger code on the glove to determine the appropriate finger for operating the particular key while maintaining physical contact between the fingertips and the keys of the keyboard.

In an alternate embodiment, a glove is provided for teaching a person wearing the glove efficient typing skills in connection with a keyboard having visually coded keys. The glove comprises a wristband that defines an open end of the glove for encircling a person's wrist. A plurality of signal members extend from the wristband. Each of the signal members bears a different visual code that corresponds to one of the visually coded keys on the keyboard. A plurality of finger sleeves have open distal ends for receiving a person's fingertips therethrough. Each finger sleeve extends outwardly from one of the signal members opposite to the wristband. A person wearing the glove while typing visually matches the code of the key to be typed with the respective one of the codes of the signal members to determine the appropriate finger to use when operating the particular key.

Objects, features and advantages of the present invention will become apparent upon reading the following detailed description of the disclosed embodiment of the present invention in conjunction with the appended drawings and claims.

DETAILED DESCRIPTION

Figure 1:
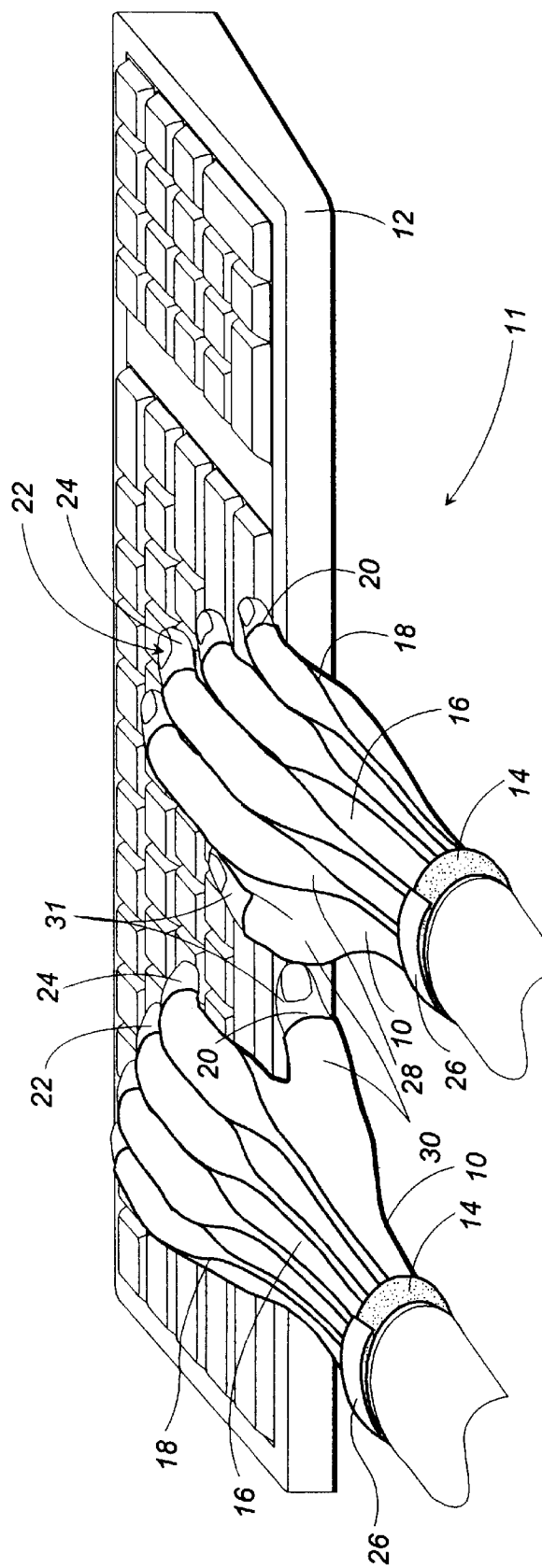
FIG. 1 is a front right perspective view of a device for teaching typing including a pair of gloves being worn by a typist and a keyboard, according to the present invention.

Referring now in more detail to the drawings in which like numerals refer to like parts throughout the several views, FIG. 1 is a front right perspective view illustrating a device 11 for teaching typing which device is shown on hands of a typist operating a keyboard 12. The device 11 comprises a pair of gloves 10 which are worn on the hands of a typist who uses the keyboard 12. Each of the gloves 10 includes a wristband 14 that encircles one of the typist's wrists. A backhand section 16 of each glove 10 extends from the wristbands 14. The backhand section 16 covers the backside of the typist's hands. A forehand section (not illustrated) of each of the gloves 10 extends from the wristband 14 opposite the backhand section 16. The forehand section opposes the backhand section 16 and covers the palm of the typist's hand. The backhand section 16 and the forehand section connect along side edges to define a tubular body for receiving the typist's hand through the open end encircled by the wristband 14.

A plurality of finger sleeves 18 extend from the backhand section 16 and the forehand section opposite the wristband 14. Each of the finger sleeves 18 defines an open ended tube extending to a distal end 20. The distal end 20 of each finger sleeve 18 defines an open egress 22 for receiving therethrough a fingertip 24. Preferably, each finger sleeve 18 is of a length that covers approximately two-thirds of the length of a typist's finger and thereby exposes approximately a third of the length of the finger nearest the fingertip 24. This enables each fingertip 24 to contact directly the keys of the keyboard 12.

Each of the wristbands 14 is preferably comprised of a fabric material, such as canvas, nylon or other woven fabric. The wristband 14 includes a fastener 26 for securing each glove 10 to one of the typist's hands. The fastener 26 is preferably of a hook and loop type material which matingly detachably engage, but may also be a snap button, button and loop closure, clip, or other such mateable fastener. In an alternate embodiment, the wristband 14 comprises an elastic band without a fastener other than the elasticity of the band itself. The backhand sections 16, the forehand sections (unshown) and the finger sleeves 18 of each glove are preferably comprised of a breathable-type cloth material such as cotton, or of a netting type material.

A plurality of visual signal strips 28 attach to each of the gloves 10. One signal strip 28 attaches to each finger sleeve 18 for visually coding a finger within each finger sleeve. The signal strips 28 are preferably durable and flexible strips of fabric material that are sewn onto the gloves 10. The strips 28 may also be painted, dyed or otherwise printed or adhered onto the gloves 10. The signal strips 28 preferably extend from the distal end 20 of each finger sleeve 18 and taper narrowly towards the wristband 14. Each signal strip 28 is preferably comprised of a color that is distinguishable from the colors of the other signal strips and the color of the backhand section 16.

One of the finger sleeves 18 of each glove 10 is a thumb sleeve 30 for receiving a thumb 31 therethrough. It is preferred that the thumb sleeve 30 not bear a signal strip 28, provided the color of the backhand section 16 and the thumb sleeve contrasts with the colors of the signal strips 28. However, the thumb sleeve 30 may bear a signal strip 28 provided the color of the signal strip contrasts with the signal strips of the other fingers.

In a second embodiment (not illustrated), the glove 10 does not include the backhand section 16 or the forehand section. Rather, the signal strips 28 extend between the wristband 14 and the finger sleeves 18 and attach the wristband to the finger sleeves.

Figure 2:
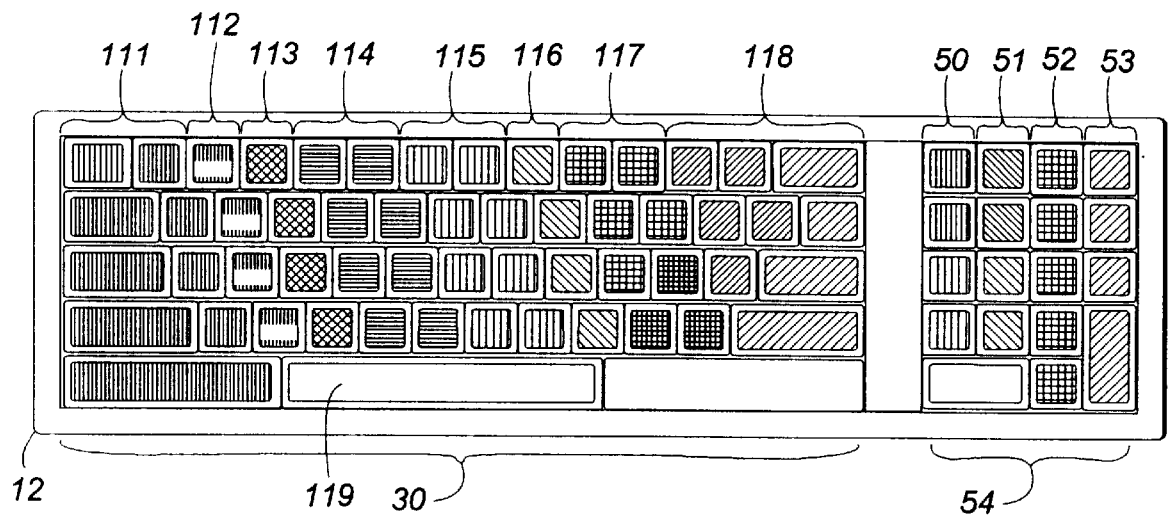
FIG. 2 is a top view of the keyboard illustrated in FIG. 1.

FIG. 2 is a top view of the keyboard 12 illustrated in FIG. 1. The keyboard 12 is a conventional computer keyboard having word processing keys generally 32 and calculator keys generally 34. The keys 32 on the keyboard 12 are divided into eight groups identified by the reference numerals 41 through 49. The groups 41–49 correspond to the different series of the word processing keys 32 that are preferably operated by specific different fingers of the typist according to conventional typing techniques. The different series 41 through 49 of the wordprocessing keys 32 are preferably colored in different colors from one another. Such coloring is preferably accomplished by painting or dying the keys 32, 34 of the keyboard 12, attaching colored stickers to the keyboard, or through use of a colored overlay such as a sheet of translucent cellophane or the like, as discussed below. The reference numerals 50 through 54 indicate different series of the calculator keys 34. The calculator keys 34 are divided into groups 50–54. The groups 50–54 are preferably colored similar to the word processing keys 32 in the series 45–49 respectively.

Figure 3:
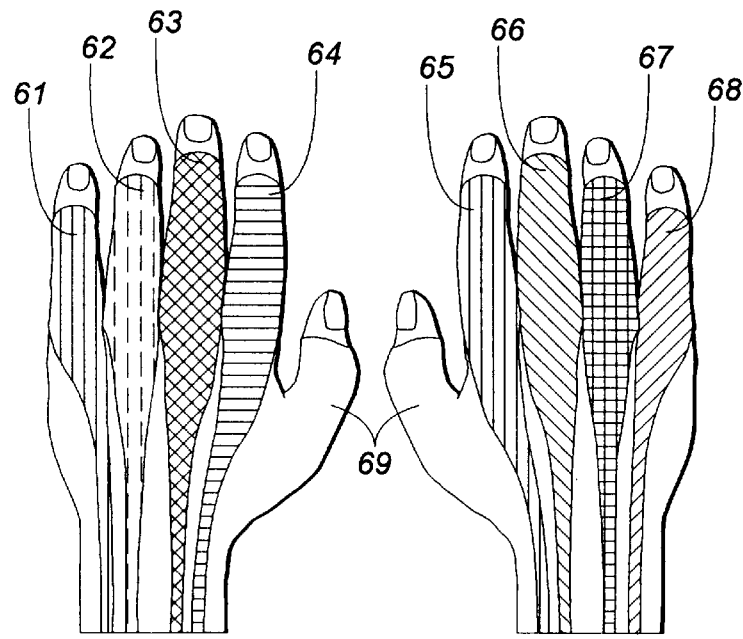
FIG. 3 is a top view of the pair of gloves illustrated in FIG. 1.

FIG. 3 is a top view of the pair of gloves 10 illustrated in FIG. 1. The reference numerals 61 through 68 indicate different colors of the signal strips 28 of the gloves 10. The reference numeral 69 indicates the color of the thumb sleeves 30 and the backhand sections 16 of the gloves 10. The color of the thumb sleeves 30 and the backhand sections 16 are preferably the same, but may be different than one another provided the colors of the thumb sleeves and the backhand sections are visually distinguishable from the colors of the signal strips 28.

In an alternate embodiment, the visual coding of the gloves 10 and the keys of the keyboard 12 may be achieved through codes other than colors. Such alternate codes include different graphic symbols, designs, patterns, pictures or the like to distinguish the finger sleeves 18 from one another.

Figure 4:
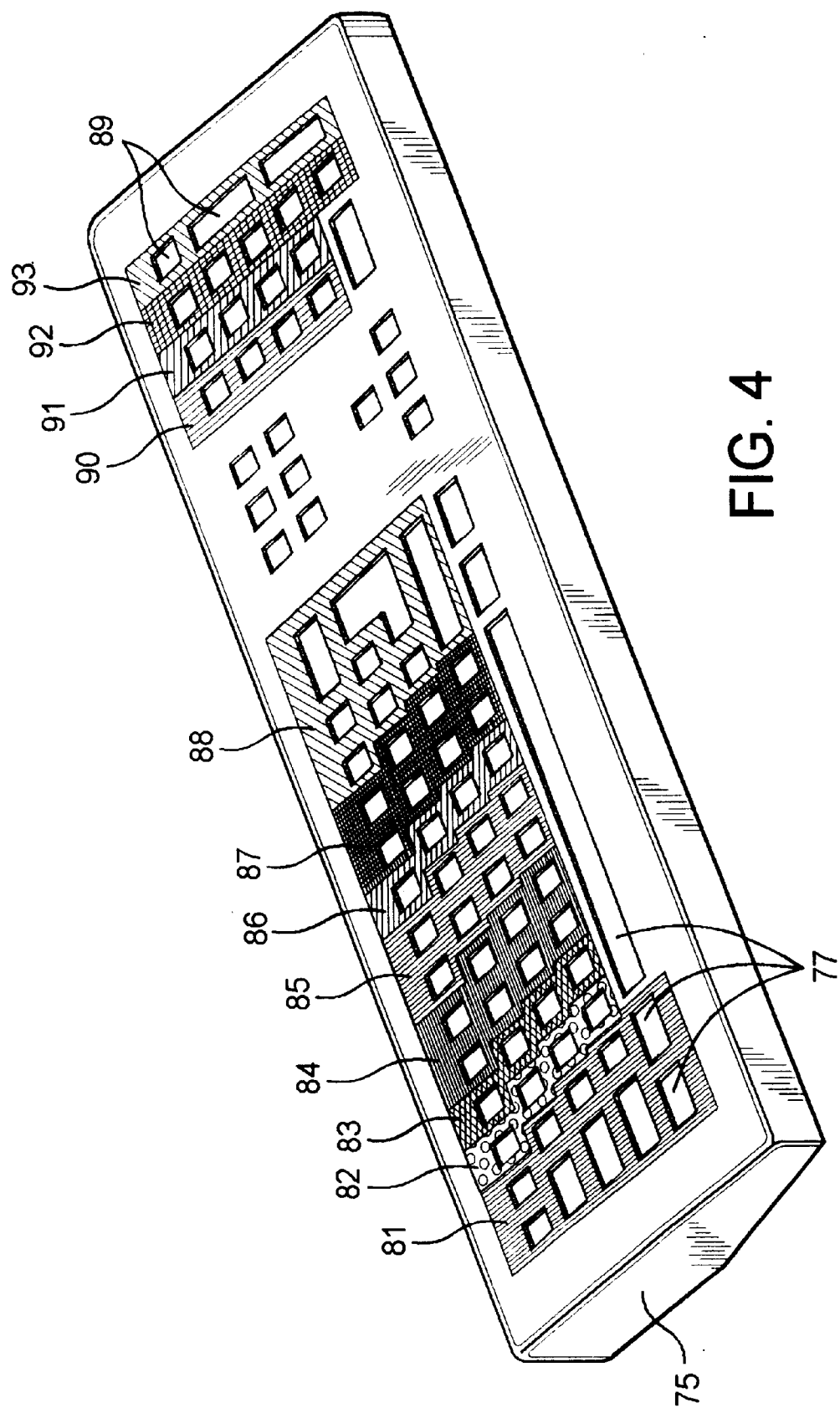
FIG. 4 is a partial perspective view of a template for placing over a keyboard for use with the glove illustrated in FIG. 1.

FIG. 4 illustrates a partial perspective view of a template 75 which overlays the keyboard 12. The template 75 is preferably comprised of a sheet of translucent material such as cellophane, plastic or the like. The template 75 defines a plurality of recesses 77, each of which is positioned and sized for receiving a wordprocessing key 32 therein. The recesses 77 and the areas of the template immediately surrounding the recesses are divided into eight fields 81–88 which correspond to the range of keys of the keyboard 12 operated by each particular finger of the typist's hands. Each field 81–88 bears a visual code, preferably a color, through which the wordprocessing keys 32 may be viewed.

Similarly, the template 75 defines a plurality of recesses 89 for the keys of the calculator keypad 34. The calculator recesses 89 and the areas of the template 75 immediately surrounding the calculator recesses are divided into fields 90–93 corresponding to the four fingers conventionally used to operate the calculator keypad 34. Each field 90–93 bears a visual code, preferably a color, through which the calculator keys 34 may be viewed.

In an alternate embodiment, the template 75 is a continuous sheet that overlays the keyboard 12. In this embodiment, the template 75 has outline markings instead of the recesses 77 and 89. The outline markings identify the positions of the keys 32 and 34 within the fields 81–88 and 90–93. The outline markings are preferably lines drawn or imprinted on the template 75, but may also be letters or numbers of the keys 32 and 34 themselves.

In operation, the gloves 10 are fitted onto a typist's hands. The hand extends fingers first through the opening defined by the wristband 14. The fingertips 24 then extend through the finger sleeves 28 and beyond the distal ends 26 through the egresses 22. The fingertips 24 are thereby exposed from the exterior of the glove 10 for contacting directly the keys 32, 34 of the keyboard 12. The wristband 14 is fastened with the fastener 26 to secure the gloves 10 to the user's hands. In the embodiment illustrated in FIGS. 1 and 3, the mating hook and loop faces of the fastener 26 are engaged together.

As seen in FIG. 2, the typist, desiring to operate a particular one of the object keys 32, 34, observes the color of the groupings 41 through 49, or 50 through 54, within which the object key is located on the keyboard 12. The typist thereby associates the particular key 32 with an appropriate finger by matching the color of the grouping with the color of the finger signal strip 28. The typist then visualizes the color 61 through 69 of the signal strips 28 on the gloves 10 that matches the color 41 through 49, or 50 through 54 of the keys 32, 34 in the keyboard 12. The user then uses the fingertip 24 underneath the matching signal strip 28 to operate the desired object key 32, 34. The signal strips 28 guide the eye along the hand to the finger to operate the selected key.

For instance, if the typist desires to type a key 32a in the series 41 of the wordprocessing keys 32, the typist identifies the color of the key 32a. The typist then matches that color to one of the signal strips 28. The signal strip 28 guides the eye to the finger associated with the selected color. The typist thereby determines the appropriate finger for operating the key 32a by matching the color of the series 41 to the color of the signal strip 61 that covers the appropriate finger. Similarly, if the typist desires to type a key 32b in the series 42 through 49 of the wordprocessing keys 32, the typist matches the color of the key 32b with the color of the respective signal strip 62 through 69. The typist thereby associates the key 32b with the particular finger covered by the respective signal strip 62 through 69 matching the color of the key. Similar further, if the typist desires to type a key 34a in the series 50 through 54 of the calculator keys 34, the color of the selected key 34a is matched to the respective signal strip 65 through 69 to signal the typist that the finger covered by the respective signal strip 65 through 69 is the appropriate finger to use for operating that key.

It is preferred that a typist curl the hands somewhat as shown in FIG. 1 in order to properly and efficiently type on the keyboard 12. It is also preferred that a typist maintain contact between the fingertips 24 and at least the "home" keys of the keyboard 12. The home keys are conventionally the row of keys on which the fingers rest, pending movement to strike a selected key. It is further preferred that a typist maintain eye contact with the material to be typed rather than looking downward at the keyboard 32 or the fingers. The elongation of the signal strips 28 from the finger sleeves 18 to the backhand section 16, or to the wristband 14 of the gloves 10, enables a typist to use peripheral vision to view and match the colors of the signal strips 28 to the colors of the keys 32, 34 while properly curling the hands, maintaining contact between fingertips and the keys 32, 34, and maintaining eye contact with the text material being typed.

It thus is seen that a new device for teaching typing is now provided that overcomes problems long associated with those of prior art. It should be understood however that many modifications, additions and deletions may be made thereto without departure from the spirit and scope of the invention as set forth in the following claims.

What is claimed is:

1. An apparatus for teaching efficient typing, comprising:
a glove having
a wristband for encircling a person's wrist;
a backhand section adjacent said wristband for covering the back of the person's hand;
a plurality of finger sleeves adjacent said backhand section opposite said wristband, each of said finger sleeves having an opening at a distal end for exposing a fingertip; and
a plurality of finger codes extending from said finger sleeves to said wristband, each of said elongated finger codes attached to said backhand section being visually different from said other finger codes, and each of said finger codes being associated with a respective one of said finger sleeves; and
a keyboard having a plurality of keys, each of said keys bearing a key code that visually corresponds to one of said finger codes,
whereby a person wearing the glove visually matches the key code on a particular key to the corresponding finger code on the glove to determine the appropriate finger for operating the particular key and maintains physical contact between the person's fingertips and the keys of the keyboard.

2. The apparatus of claim 1 further comprising a pair of said gloves.

3. The apparatus of claim 1 wherein each of said finger codes extends from one of said distal ends of one of said finger sleeves to said wristband.

4. The apparatus of claim 1 wherein said finger codes and said key codes are colors.

5. The apparatus of claim 4 wherein each of said key codes codes a separate grouping of said keys on said keyboard, and wherein each of said keys within each of said groupings of keys bears the same color as one of said finger codes for identifying the appropriate finger for operating a particular key within one of said groupings of said keys.

6. The apparatus of claim 1 wherein said key codes are included in an overlay sheet for covering said keyboard.

7. The apparatus of claim 2 wherein said finger codes that correspond to a person's thumbs are the same.

8. A glove for teaching a person wearing said glove efficient typing skills in connection with a keyboard having visually coded keys, said glove comprising:
a wristband defining an open end of said glove for encircling a person's wrist;
a plurality of signal members extending from said wristband, each of said signal members adapted for partially covering a back of a hand and bearing a different visual code that corresponds to one of the visually coded keys on the keyboard; and
a plurality of finger sleeves, each of said finger sleeves having an open distal end for receiving a fingertip therethrough and extending outwardly from at least one of said signal members opposite to the wristband,
whereby a person wearing the glove while typing visually matches the code of the key to be typed with a respective one of the codes of the signal members to determine the appropriate finger to use when operating said particular key.

9. The glove of claim 8, wherein the codes of the signal members are visually contrasting.

10. The glove of claim 8, wherein said signal members comprise elongate strips of a fabric material which are attached to said wristband and said finger sleeves.

11. The glove of claim 10, wherein each of said signal members extends from a said distal end of one of said finger sleeves to said wristband.

12. The glove of claim 11, wherein said signal members taper narrowingly from said finger sleeves to said wristband.

13. The glove of claim 8, further comprising a tubular body extending between said wristband and said finger sleeves, said body defined by a backhand portion for covering a back of a hand and a forehand portion for covering a palm of a hand.

* * * * *